United States Patent
Ochiai et al.

(10) Patent No.: US 11,104,151 B2
(45) Date of Patent: Aug. 31, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Takashi Ochiai, Machida (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/565,926

(22) Filed: Sep. 10, 2019

(65) Prior Publication Data
US 2020/0079102 A1 Mar. 12, 2020

(30) Foreign Application Priority Data

Sep. 12, 2018 (JP) .............................. JP2018-170604

(51) Int. Cl.
| | | |
|---|---|---|
| *B41J 2/205* | (2006.01) | |
| *B41J 2/21* | (2006.01) | |
| *H04N 1/405* | (2006.01) | |
| *H04N 1/50* | (2006.01) | |

(52) U.S. Cl.
CPC ........... *B41J 2/2054* (2013.01); *B41J 2/2121* (2013.01); *H04N 1/506* (2013.01)

(58) Field of Classification Search
CPC ..................................................... B41J 2/2132
See application file for complete search history.

(56) References Cited

U.S. PATENT DOCUMENTS

| | | |
|---|---|---|
| 9,150,012 B2 | 10/2015 | Ochiai et al. |
| 9,462,091 B2 | 10/2016 | Hara et al. |
| 9,485,388 B2 | 11/2016 | Kodama et al. |
| 9,734,439 B2 | 8/2017 | Hara et al. |
| 9,749,496 B2 | 8/2017 | Fujimoto et al. |
| 10,027,848 B2 | 7/2018 | Fuse et al. |
| 10,043,118 B2 | 8/2018 | Sumi et al. |

(Continued)

FOREIGN PATENT DOCUMENTS

JP 2011207175 A 10/2011

OTHER PUBLICATIONS

Machine generated English translation of JP 2011207175A to Shibata, "Image Forming Device"; translation generated via worldwide.espace.net.com on Oct. 23, 2020; 25pp.*

*Primary Examiner* — Shelby L Fidler
(74) *Attorney, Agent, or Firm* — Carter, DeLuca & Farrell LLP

(57) ABSTRACT

An image processing apparatus generates dot data for printing an image on a printing medium by using dots of different sizes formed by a plurality of nozzles ejecting ink. The image processing apparatus includes a first acquisition unit that acquires dot data specifying printing or non-printing of each of the dots of a plurality of sizes for each pixel, a specification unit that specifies a dot having a strong possibility of being pulled by a dot having landed earlier on the printing medium of dots in the dot data, and a correction unit that corrects a dot specified by the specification unit in the dot data. The image processing apparatus can output an image whose banding is unlikely to be recognized by suppressing image defect due to a change of dots accompanying liquid droplet interference.

16 Claims, 15 Drawing Sheets

(56) References Cited

U.S. PATENT DOCUMENTS

| | | | |
|---|---|---|---|
| 10,057,459 B2 | 8/2018 | Yamamoto et al. | |
| 10,063,743 B2 | 8/2018 | Fuse et al. | |
| 10,073,370 B2 | 9/2018 | Takikawa et al. | |
| 10,187,553 B2 | 1/2019 | Takesue et al. | |
| 10,194,053 B2 | 1/2019 | Otani et al. | |
| 10,356,282 B2 | 7/2019 | Ochiai et al. | |
| 2005/0219297 A1* | 10/2005 | Hirakawa | B41J 2/2132 347/15 |
| 2006/0109295 A1* | 5/2006 | Kusunoki | B41J 2/2132 347/15 |
| 2013/0182027 A1* | 7/2013 | Wakui | B41J 2/2128 347/12 |
| 2017/0013166 A1* | 1/2017 | Katsuyama | H04N 1/4078 |
| 2017/0139363 A1 | 5/2017 | Takikawa et al. | |
| 2018/0295258 A1 | 10/2018 | Ochiai et al. | |
| 2018/0324327 A1 | 11/2018 | Moribe et al. | |
| 2018/0370247 A1* | 12/2018 | Kuki | B41J 2/2139 |
| 2019/0156164 A1 | 5/2019 | Yanai et al. | |
| 2020/0074251 A1 | 3/2020 | Takesue et al. | |

\* cited by examiner

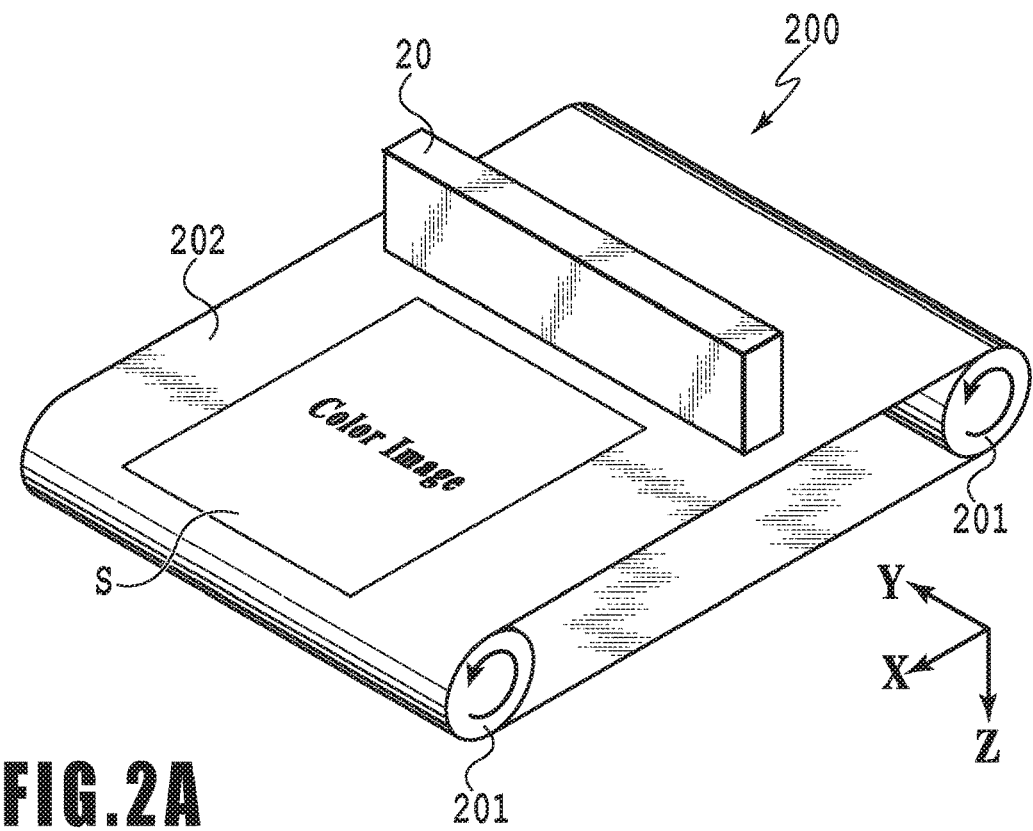
FIG.2A
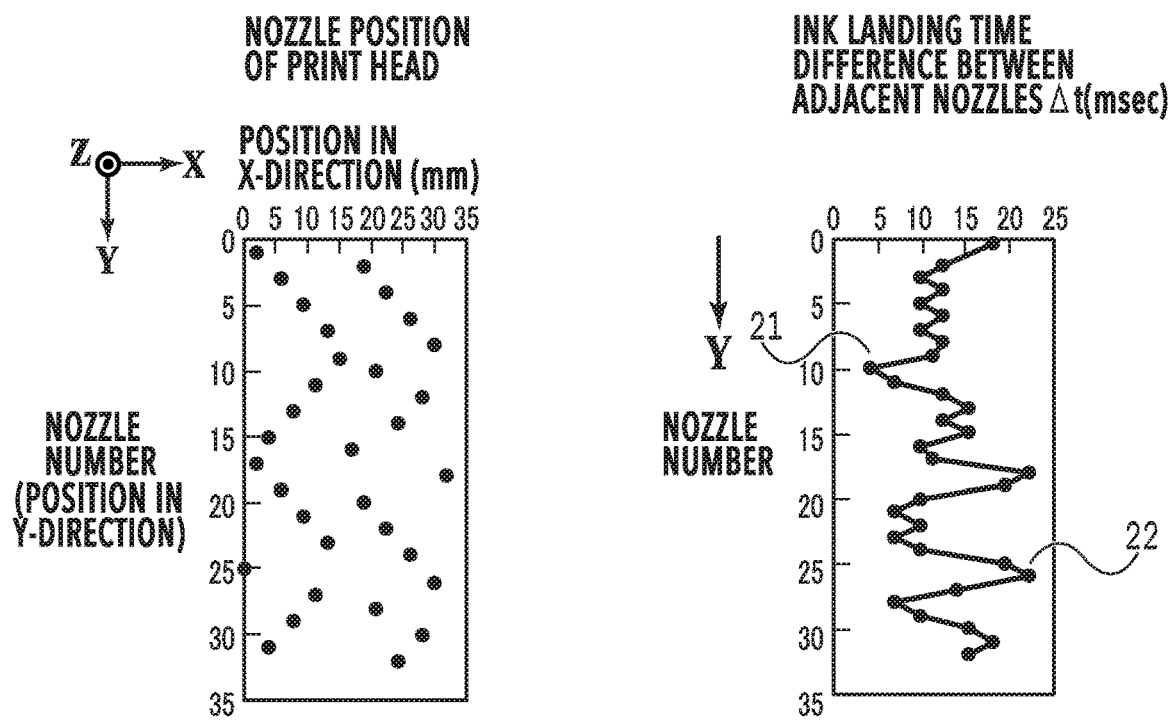
FIG.2B
FIG.2C

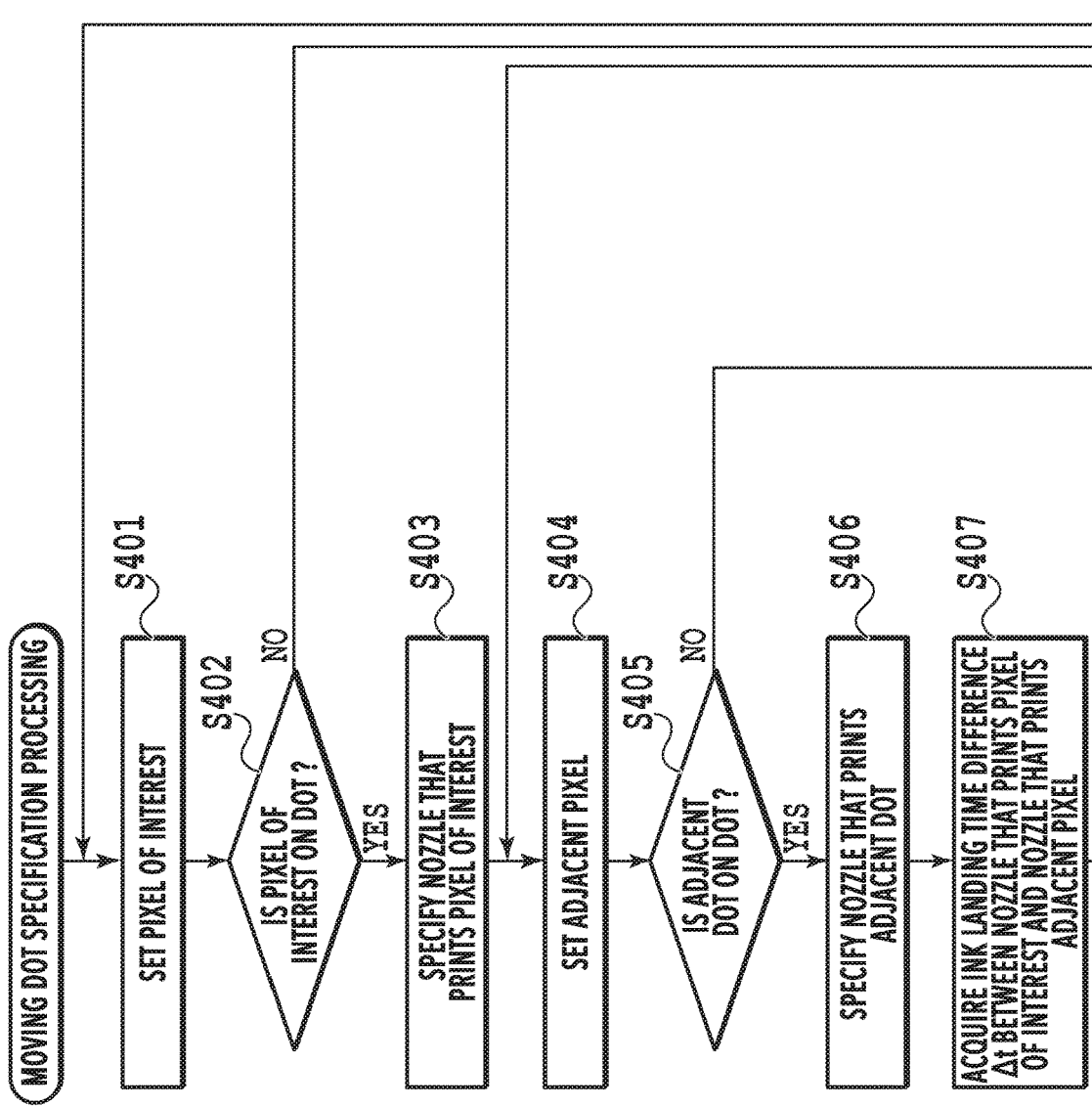

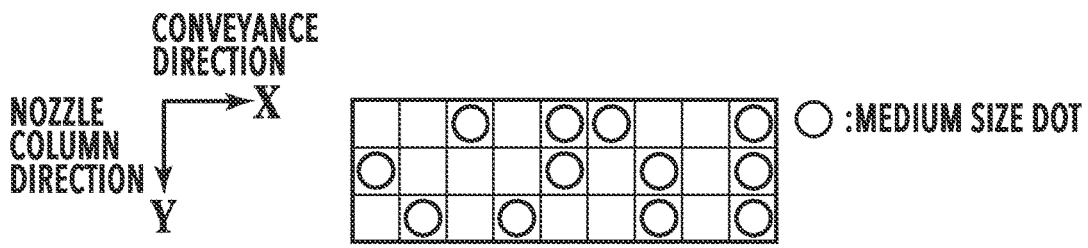
FIG.6A
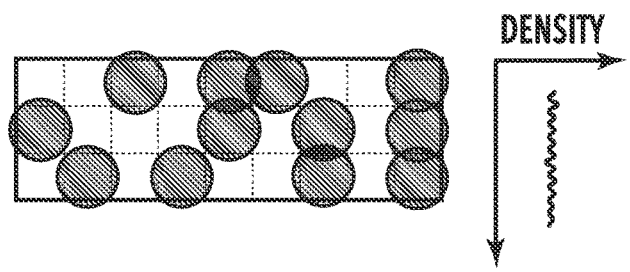
FIG.6B
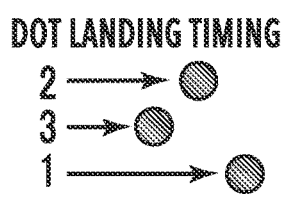 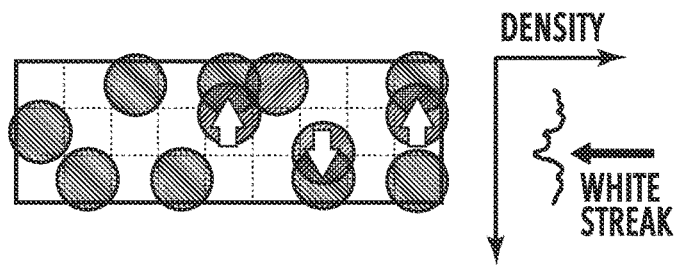
FIG.6C
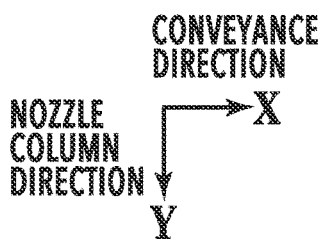 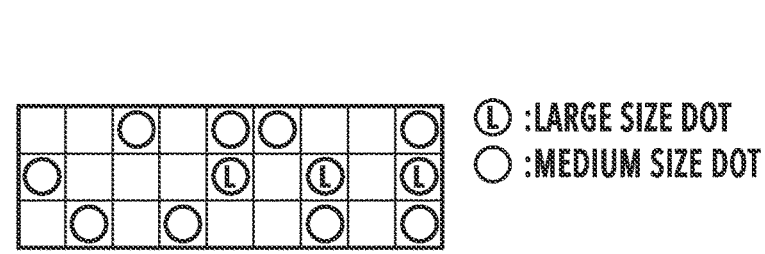
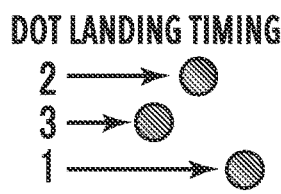 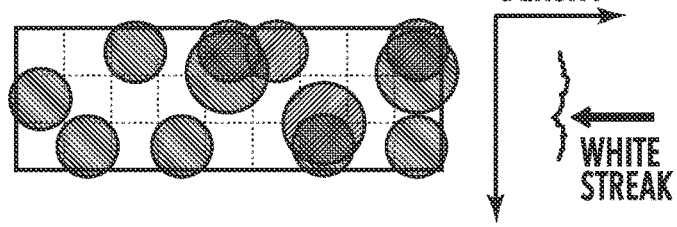
FIG.6D

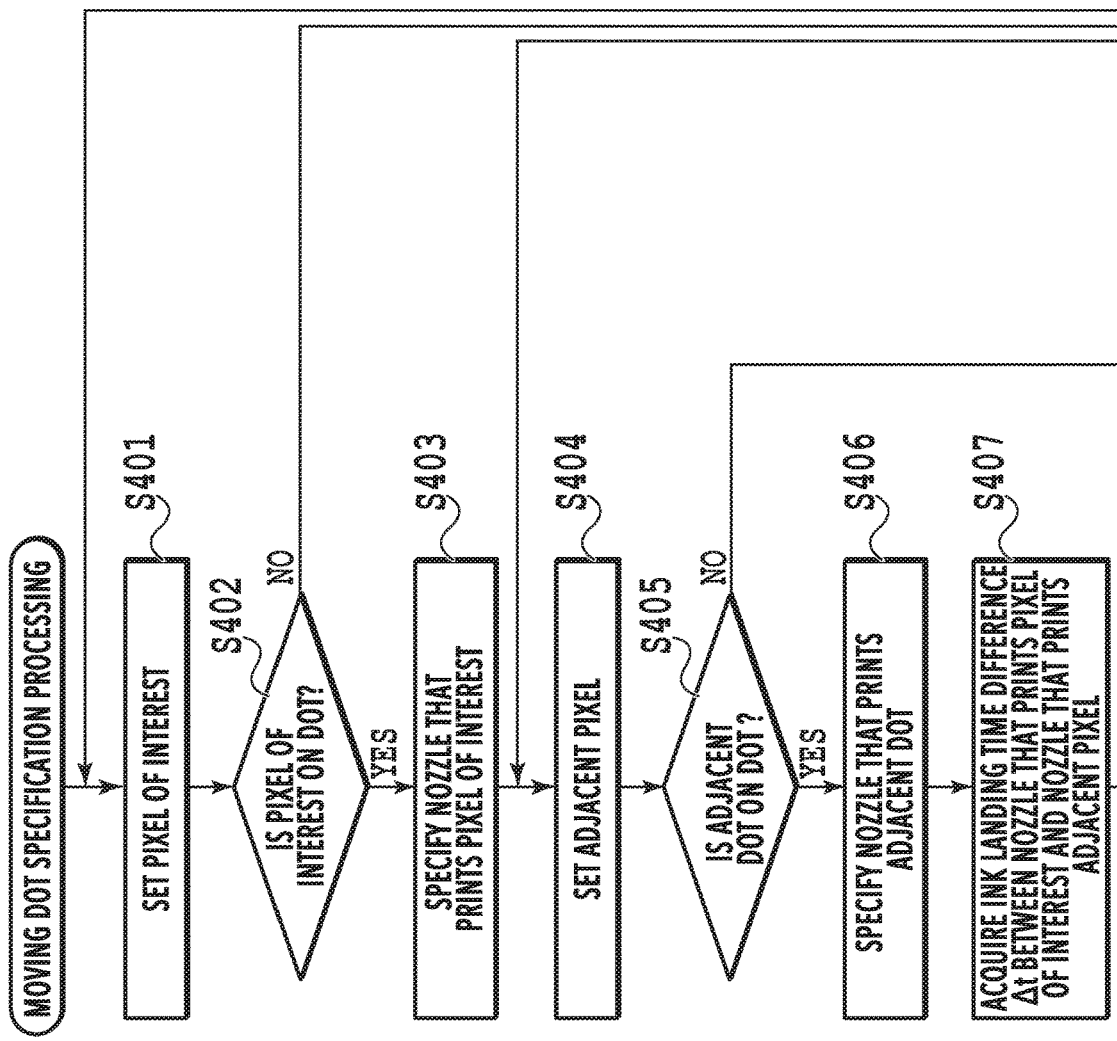

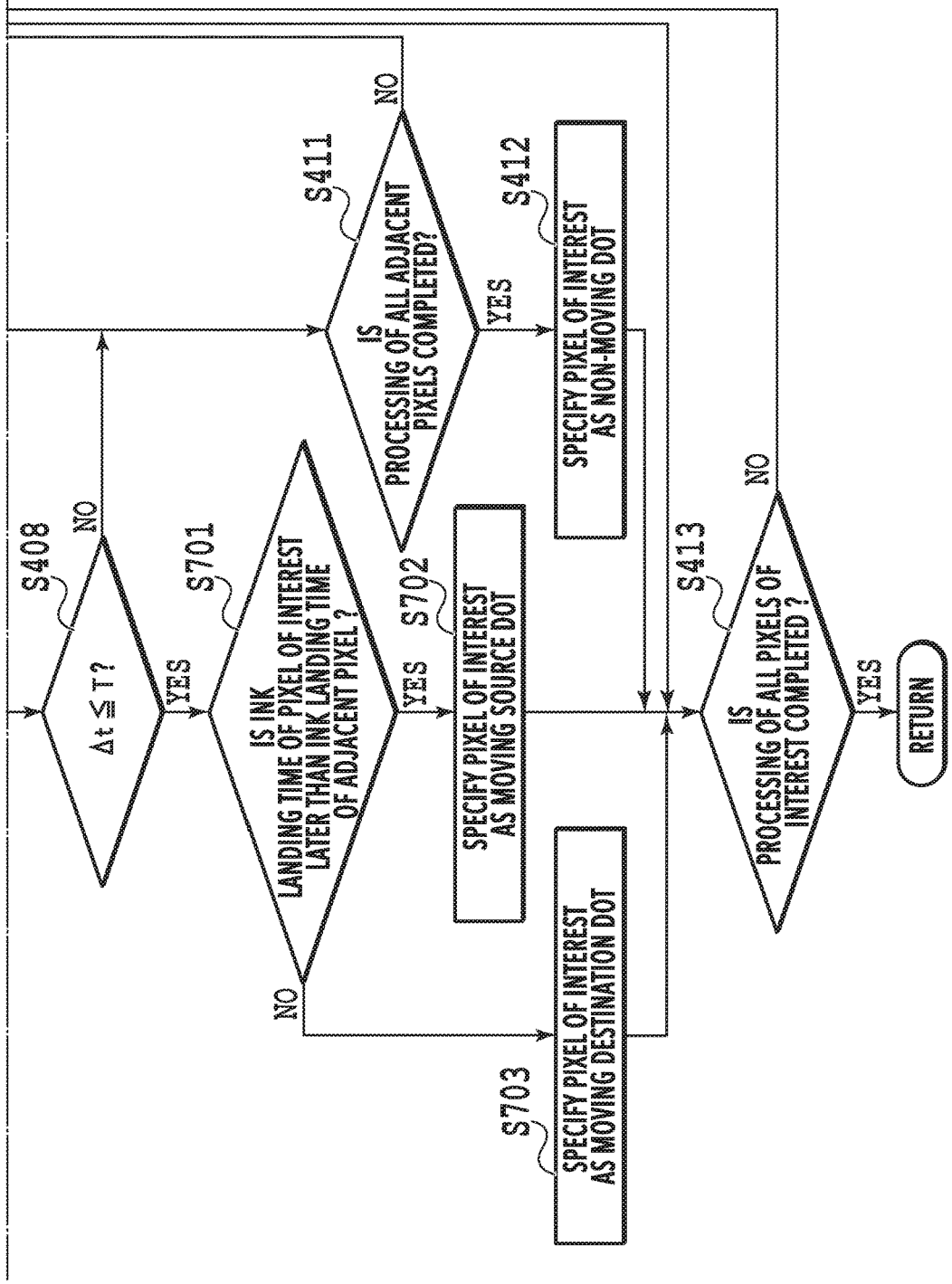

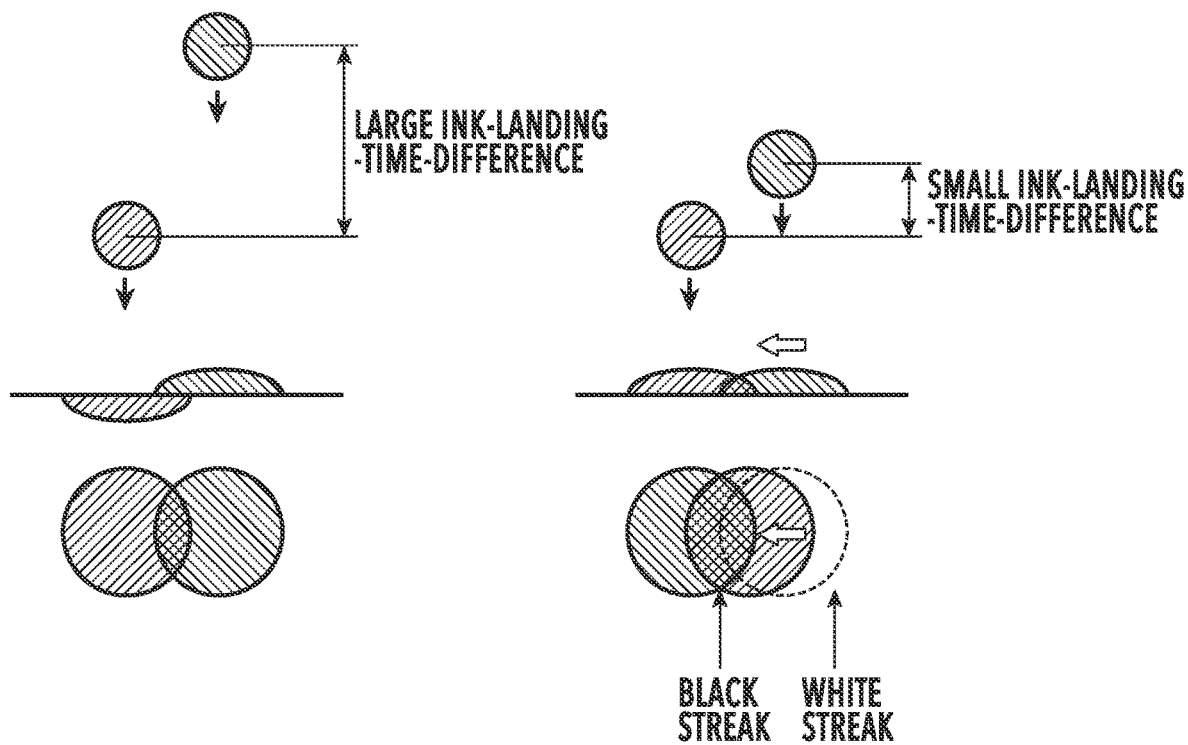

IMAGE PROCESSING APPARATUS, IMAGE PROCESSING METHOD AND STORAGE MEDIUM

BACKGROUND OF THE INVENTION

Field of the Invention

The present invention relates to an image processing apparatus, an image processing method, and a storage medium. In particular, the present invention relates to an image processing method for suppressing image defect resulting from interference between liquid droplets of an image to be printed by an ink jet printing apparatus.

Description of the Related Art

By a single-pass printing method that prints an image by causing a print head to perform a relative scan once for the same image area of a printing medium, it is possible to output an image at a high speed compared to a multi-pass printing method that prints an image by causing a print head to perform a scan a plurality of times for the same image area.

However, in a case where the print head is an ink jet print head, the single-pass printing method such as this may bring about a concern of image defect due to liquid droplet interference. The liquid droplet interference is a phenomenon accompanied by a change of dots, which occurs in a case where a liquid droplet having landed on a printing medium contacts another liquid droplet having landed later at an adjacent position and both the liquid droplets pull each other before the liquid droplet having landed earlier is absorbed by the printing medium. There is a case where the liquid droplet interference is recognized as banding (streak heterogeneity or density unevenness) in the entire image.

Japanese Patent Laid-Open No. 2011-207175 has disclosed an image processing method of correcting multi-valued data before quantization based on the results of a prediction of the degree of liquid droplet interference for each pixel in order to suppress banding resulting from the liquid droplet interference such as this. By adopting the method described in Japanese Patent Laid-Open No. 2011-207175, it is possible to mitigate density unevenness of an entire image because more dots are printed at a position of a nozzle that is likely to cause white streaks to occur due to liquid droplet interference However, the method described in Japanese Patent Laid-Open No. 2011-207175 performs correction in the state of multi-valued data, and therefore, the number of dots printed by each nozzle is corrected in units of nozzles. That is, more dots are printed in a pixel column of a nozzle that is likely to cause white streaks to occur, and less dots are printed in a pixel column of a nozzle that is likely to cause black streaks to occur. Because of this, average density unevenness between nozzles is mitigated, but local movement of dots due to liquid droplet interference is not suppressed.

Because of this, depending on the contents of image data, a change of dots due to liquid droplet interference is conspicuous and there is a case where image defect, such as banding, is recognized also in an image after correction.

SUMMARY OF THE INVENTION

The present invention has been made in order to solve the above-described problem. Consequently, an object thereof is to provide an image processing apparatus and an image processing method capable of outputting an image whose banding is unlikely to be recognized by suppressing image defect due to a change of dots accompanying liquid droplet interference.

In a first aspect of the present invention, there is provided an image processing apparatus that generates dot data for printing an image on a printing medium by using dots of different sizes formed by a plurality of nozzles ejecting ink, the image processing apparatus, comprising:

a first acquisition unit configured to acquire dot data that specifies printing or non-printing of each of the dots of a plurality of sizes for each pixel;

a specification unit configured to specify a dot having a strong possibility of being pulled by a dot having landed earlier on the printing medium of dots in the dot data; and a correction unit configured to correct a dot specified by the specification unit in the dot data.

In a second aspect of the present invention, there is provided an image processing method that generates dot data for printing an image on a printing medium by using dots of different sizes formed by a plurality of nozzles ejecting ink, the image processing method comprising:

a first acquisition step of acquiring dot data that specifies printing or non-printing of each of the dots of a plurality of sizes for each pixel;

a specification step of specifying a dot having a strong possibility of being pulled by a dot having landed earlier on the printing medium of dots in the dot data; and a correction step of correcting a dot specified at the specification step in the dot data.

In a third aspect of the present invention, there is provided a non-transitory computer readable storage medium storing a program for causing a computer to function as each unit of an image processing apparatus that generates dot data for printing an image on a printing medium by using dots of different sizes formed by a plurality of nozzles ejecting ink, the image processing apparatus, comprising:

a first acquisition unit configured to acquire dot data that specifies printing or non-printing of each of the dots of a plurality of sizes for each pixel;

a specification unit configured to specify a dot having a strong possibility of being pulled by a dot having landed earlier on the printing medium of dots in the dot data; and a correction unit configured to correct a dot specified by the specification unit in the dot data.

Further features of the present invention will become apparent from the following description of exemplary embodiments with reference to the attached drawings.

BRIEF DESCRIPTION OF THE DRAWINGS

FIGS. 2A to 2C are diagrams showing an outline configuration of an ink jet printer;

FIG. 4 is a diagram showing the relationship of FIGS. 4A and 4B;

FIG. 4A is a flowchart for explaining moving dot determination processing;

FIGS. 6A to 6D are each a diagram showing a printed state in a case where image processing of a first embodiment is performed;

FIG. 7 is a diagram showing the relationship of FIGS. 7A and 7B;

FIG. 7A is a flowchart for explaining moving dot determination processing;

FIG. 7B is a flowchart for explaining moving dot determination processing;

FIGS. 13A and 13B are schematic diagrams for explaining liquid droplet interference.

DESCRIPTION OF THE EMBODIMENTS

In the following, with reference to the attached drawings, the present invention is explained in detail based on preferred embodiments. Configurations shown in the following embodiments are merely exemplary and the present invention is not necessarily limited to the configurations shown schematically.

First Embodiment

Figure 1A:
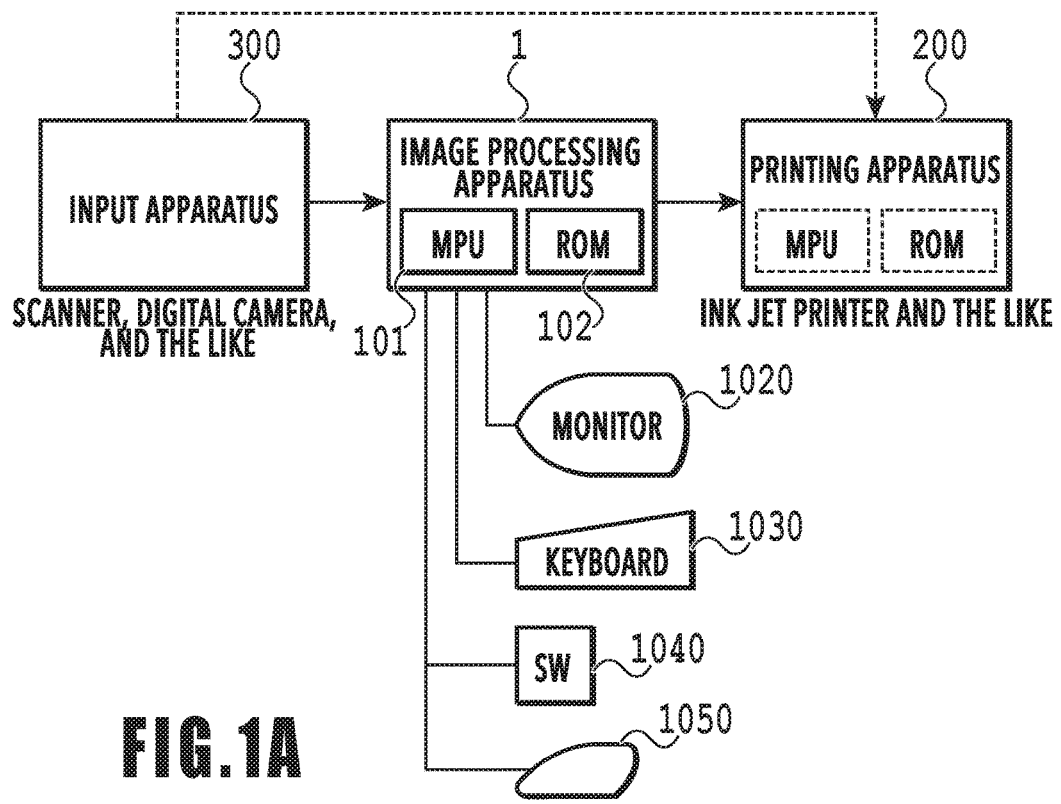
FIGS. 1A and 1B are block diagrams for explaining a configuration of control of an image processing system and an image processing apparatus.
Figure 1B:
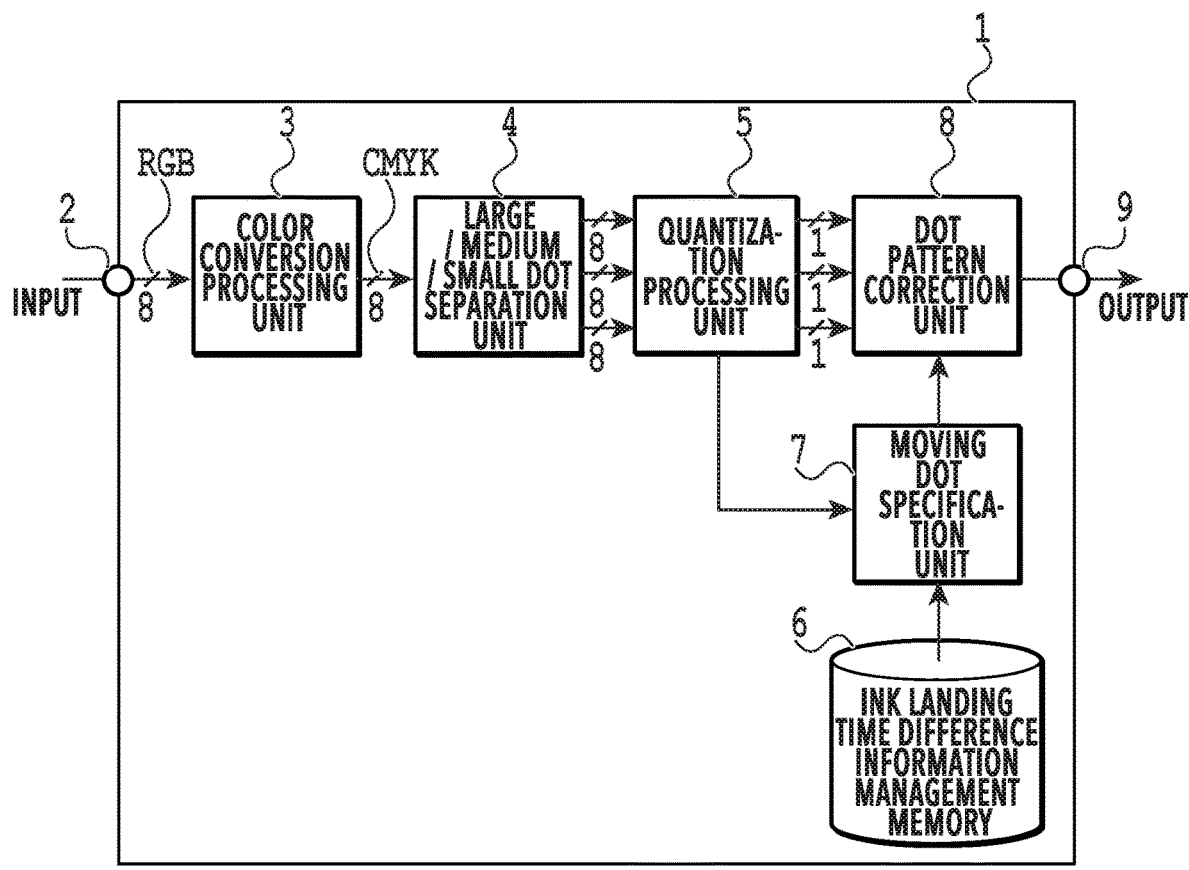

FIGS. 1A and 1B are block diagrams for explaining a configuration of control of an image processing system and an image processing apparatus used in the present embodiment. As shown in FIG. 1A, an image processing apparatus 1 of the present embodiment receives image data from an input apparatus 300, such as a scanner and a digital camera, performs predetermined image processing for the image data, and outputs the image data after the processing to a printing apparatus 200.

The image processing apparatus 1 is, for example, a personal computer (PC) and an MPU 101 performs a variety of pieces of processing in accordance with programs and parameters stored in a ROM 102. A monitor 1020 includes a CRT, a PDP, an LCD, or the like and under instructions of the MPU 101, displays images, information to be provided to a user, and the like. A keyboard 1030, a switch 1040, and a pointing device 1050 are devices for receiving a command from a user. For example, it is possible for a user to modify the layout and color of an image by using these devices while checking the image displayed on the monitor 1020.

The printing apparatus 200 is an ink jet printer and an MPU performs a variety of pieces of processing in accordance with programs and parameters stored in a ROM. Specifically, the printing apparatus 200 prints an image on a printing medium in accordance with dot data and the print mode specified following this, which are received from the image processing apparatus 1.

FIG. 1B is a block diagram showing a configuration of image processing in the image processing apparatus 1. In the present embodiment, image data that is output from the input apparatus 300 is 8-bit luminance data of RGB and input to the image processing apparatus 1 via an input terminal 2.

In the image processing apparatus 1, first, a color conversion processing unit 3 converts 8-bit luminance data of RGB into 8-bit density data of cyan (C), magenta (M), yellow (Y), and black (K) corresponding to ink colors used in the printing apparatus 200. It is possible to perform the conversion processing such as this by using a three-dimensional lookup table stored in advance in the ROM 102 of the image processing apparatus.

A large/medium/small dot separation unit 4 separates the 8-bit density data of each color into density data corresponding to a large dot, a medium dot, and a small dot, respectively. It is possible to perform the separation processing such as this by using a one-dimensional lookup table stored in advance in the ROM 102 of the image processing apparatus.

A quantization processing unit 5 binarizes each piece of the density data received from the large/medium/small dot separation unit 4 and sets printing (1) or non-printing (0) of a dot for each pixel. As a method of binarization processing, it is possible to use a dither method, an error diffusion method, or the like. The density data for a large dot, a medium dot, and a small dot is quantized individually, but control is performed so that the pixel positions at which a large dot, a medium dot, and a small dot are printed are exclusive from one another. As a result of this, by the quantization processing unit 5, dot data that sets which of a large dot, a medium dot, and a small dot is printed, or that a dot is not printed for each pixel is generated.

An ink-landing-time-difference information management memory 6 is a memory that manages information relating to an ink-landing-time-difference (also referred to as time difference information or ink-landing-time-difference information) of each nozzle arrayed in a print head 20 (see FIGS. 2A to 2C) used by the printing apparatus 200. Here, "ink-landing-time-difference" means a difference between landing times of two liquid droplets. A moving dot specification unit 7 refers to the ink-landing-time-difference information management memory 6 and based on the ink-landing-time-difference of each nozzle, specifies a dot having a strong possibility that the centroid position moves by being pulled by a dot having landed earlier due to post-landing liquid droplet interference of the dots that are set to printing (1) by the quantization processing unit 5 as a moving dot.

A dot pattern correction unit 8 performs predetermined correction processing for the dot data specified as a moving dot by the moving dot specification unit 7. By the dot pattern correction unit 8, which of a large dot, a medium dot, and a small dot is printed, or a dot is not printed is finally determined for each pixel. The dot data after the correction is output to the printing device 200 via an output terminal 9.

Details of the ink-landing-time-difference information managed by the ink-landing-time-difference information management memory 6, the moving dot specification processing by the moving dot specification unit 7, and the correction processing performed by the dot pattern correction unit 8 will be described later in detail.

FIGS. 2A to 2C are diagrams showing an outline configuration of an ink jet printer used as the printing apparatus 200. As shown in FIG. 2A, a printing medium S placed on a belt 202 is conveyed in an X-direction along with the belt 202 by the rotation of two conveyance rollers 201. On the way of the conveyance path, the print head 20 having a length corresponding to the width of the printing medium S is arranged and the print head 20 ejects ink in a Z-direction in accordance with dot data to the printing medium S to be scanned relatively. That is, on the printing medium S, a desired image is printed by one-time conveyance for the print head 20.

In the print head 20, on the surface facing the printing medium S, a plurality of nozzles is laid out. In more detail, four nozzle columns, each including nozzles ejecting ink of the same color arrayed in a Y-direction intersecting the relative scan direction described above, are arranged in the X-direction in correspondence to black, cyan, magenta, and yellow.

Each nozzle includes a piezoelectric element therein and by applying a voltage to the piezoelectric element, ink is ejected as droplets. At this time, by adjusting the shape of a voltage pulse to be applied to the piezoelectric element, the volume of the droplet to be ejected is adjusted and in the present embodiment, it is made possible to print dots of three sizes, that is, a large dot, a medium dot, and a small dot onto a printing medium. In the present embodiment, it is assumed that the area ratio of a large dot, a medium dot, and a small dot on a printing medium is 3:2:1. Further, it is assumed that in a case where the luminance value of a large dot in a printing medium is taken to be 0 and the luminance value of a white paper area is taken to be 255, the luminance value of a medium dot is 84 and the luminance value of a small dot is 168.

FIG. 2B is a diagram showing a part of the nozzle column of the black ink laid out on the print head 20. In FIG. 2B, the vertical axis represents the nozzle number, which corresponds to the position in the Y-direction in the print head 20. The horizontal axis represents the relative position in the X-direction (conveyance direction) of each nozzle. As shown in FIG. 2B, each nozzle is not arranged along one straight line in the Y-direction but arranged so as to shift from one another in the X-direction within a width of 35 mm. Because of this, the printing apparatus 200 drives each nozzle based on the printing (1) data of each pixel at timing in accordance with the nozzle position (nozzle number) to which the pixel corresponds and the conveyance speed of the printing medium S.

FIG. 2C is a diagram showing an ink-landing-time-difference of each nozzle in a case where the conveyance speed of the printing medium S is taken as 80 m/min. Here, a time difference $\Delta t$ between timing at which a liquid droplet ejected by each nozzle lands on a printing medium and timing at which a liquid droplet ejected by the nozzle adjacent in the −Y-direction to the pixel adjacent in the −Y-direction is shown.

For example, an ink-landing-time-difference between a liquid droplet ejected by the nozzle whose nozzle number is 10, which is indicated by symbol 21, and a liquid droplet ejected by the nozzle whose nozzle number is 9, which is adjacent in the −Y-direction, is about 4 msec. Further, an ink-landing-time-difference between a liquid droplet ejected by the nozzle whose nozzle number is 26, which is indicated by symbol 22, and a liquid droplet ejected by the nozzle whose nozzle number is 25, which is adjacent in the −Y-direction, is about 22 msec.

The value shown in FIG. 2C is an absolute value and whether the liquid droplet ejected by each nozzle lands before or after the liquid droplet ejected by the nozzle adjacent in the −Y-direction lands is not shown in FIG. 2C. It is assumed that in the ink-landing-time-difference information management memory 6 of the present embodiment, information on whether a liquid droplet lands before or after another liquid droplet lands at the pixel adjacent in the −Y-direction is also managed, in addition to the ink-landing-time-difference $\Delta t$ as the absolute value as shown in FIG. 2C. Further, in FIG. 2C, the ink-landing-time-difference $\Delta t$ is shown only for the 32 nozzles of black, but it is assumed that the ink-landing-time-difference information management memory 6 manages the information such as this for all the nozzles extending in the Y-direction and for all the ink colors.

Next, the liquid droplet interference is explained briefly. FIGS. 13A and 13B are schematic diagrams for explaining the liquid droplet interference. FIG. 13A shows a case where two liquid droplets land at positions adjacent to each other with a comparatively large ink-landing-time-difference being sandwiched in between. FIG. 13B shows a case where two liquid droplets land at positions adjacent to each other with a comparatively small ink-landing-time-difference being sandwiched in between.

In a case of FIG. 13A, at the time the subsequent liquid droplet lands, the preceding liquid droplet has already been absorbed in a printing medium. Consequently, the subsequent liquid droplet is absorbed in the printing medium with the landing position as a center without contacting the preceding liquid droplet.

On the other hand, in a case of FIG. 13B, at the time the subsequent liquid droplet lands, the preceding liquid droplet has not been absorbed yet in the printing medium. Consequently, these two liquid droplets contact on the printing medium and tend to contract by their respective surface tensions and the subsequent liquid droplet whose absorption has not advanced so much is pulled by the preceding liquid droplet whose absorption has advanced sufficiently. As a result of this, the subsequent liquid droplet is absorbed at a position shifted from the ink landing position, and therefore, at the position at which a dot should be formed originally by the subsequent liquid droplet (area enclosed by a broken line), a white paper area appears and the area becomes an area whose density is low. On the other hand, an area in which the dot of the preceding liquid droplet and the dot of the subsequent liquid droplet overlap more than necessary becomes an area whose density is high.

As described above, in a case where the single-pass printing method is adopted, despite the area in which the same two liquid droplets land, an area whose density is low and an area whose density is high appear continuously in the conveyance direction (X-direction) of a printing medium. Because of this, white streaks and black streaks form and they are recognized as banding in the entire image.

In a case of the present embodiment, the degree of the liquid droplet interference as explained in FIGS. 13A and 13B depends on the ink-landing-time-difference $\Delta t$, that is, the position (nozzle number) at which each nozzle is laid out in the print head 20. Consequently, in the present embodiment, the maximum value of the ink-landing-time-difference that is predicted to make problematic the movement of a dot as in FIG. 13B on an image is checked and the maximum value is set in advance as a threshold value T. Then, by comparing the ink-landing-time-difference $\Delta t$ of each nozzle with the threshold value T, a dot that is likely to move is specified as a moving dot from a dot pattern generated by the quantization processing unit 5. Then, by changing the size of the dot to a larger size, a reduction in density accompanying movement is suppressed.

Figure 3:
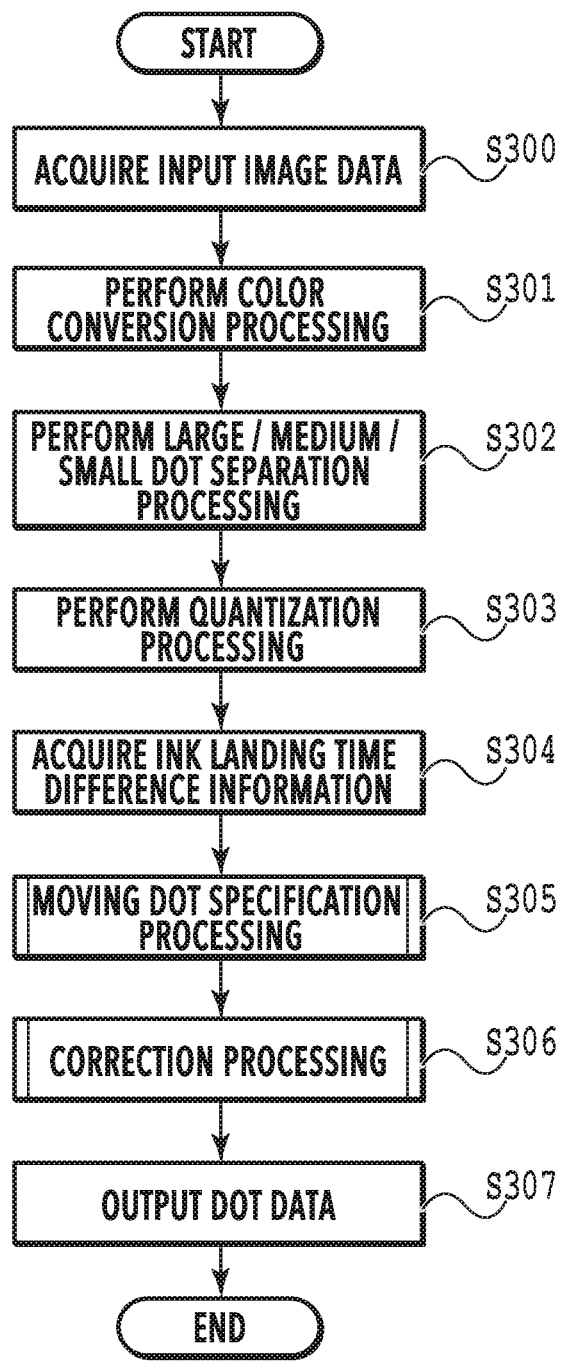
FIG. 3 is a flowchart for explaining steps of image processing.

FIG. 3 is a flowchart for explaining a step of image processing performed by the image processing apparatus 1 of the present embodiment. Each step is performed by the MPU 101 of the image processing apparatus 1 in accordance with programs and parameters, such as ink-landing-time-difference information, stored in the ROM 102.

In a case where this processing is started, first, at S300, the MPU 101 acquires input image data from the input apparatus 300. The image data acquired here is 8-bit luminance data of RGB for all the pixels included in a one-page area of the printing medium S.

At S301, the MPU 101 performs color conversion processing for all the image data acquired at S300 and converts the 8-bit luminance data of RGB into 8-bit density data of CMYK. The following processing is performed in parallel for each of CMYK, and here, the processing for only one color is explained.

At S302, the MPU 101 separates the 8-bit density data obtained at S301 into large dot data, medium dot data, and small dot data based on the first two bits. Due to this, the 8-bit density data of each pixel is converted into 6-bit density data associated with one of a large dot, a medium dot, and a small dot.

At S303, the MPU 101 performs predetermined quantization processing for the 6-bit density data generated at S302 and generates 1-bit binary dot data. In the present embodiment, it is assumed that the error diffusion processing method is used as the publicly-known quantization processing. Due to this, for each pixel included in one page, dot data indicating one of printing of a large dot, printing of a medium dot, printing of a small dot, and non-printing is set. That is, the MPU 101 acquires dot data specifying printing or non-printing of each of dots of a plurality of sizes for each pixel.

At S304, the MPU 101 acquires ink-landing-time-difference information stored in advance in a memory. Then, at S305, based on the ink-landing-time-difference Δt acquired at S304, a moving dot is specified from the dot data set at S303.

At S306, the MPU 101 changes the dot size of the dot specified as the moving dot at S305 to a larger dot size. Due to this, final dot data in which one of printing of a large dot, printing of a medium dot, printing of a small dot, and non-printing is determined for all the pixels included in the one-page area is generated.

At S307. the dot data generated at S306 is output to the printing apparatus 200. By the above, this processing terminates.

Figure 4B:
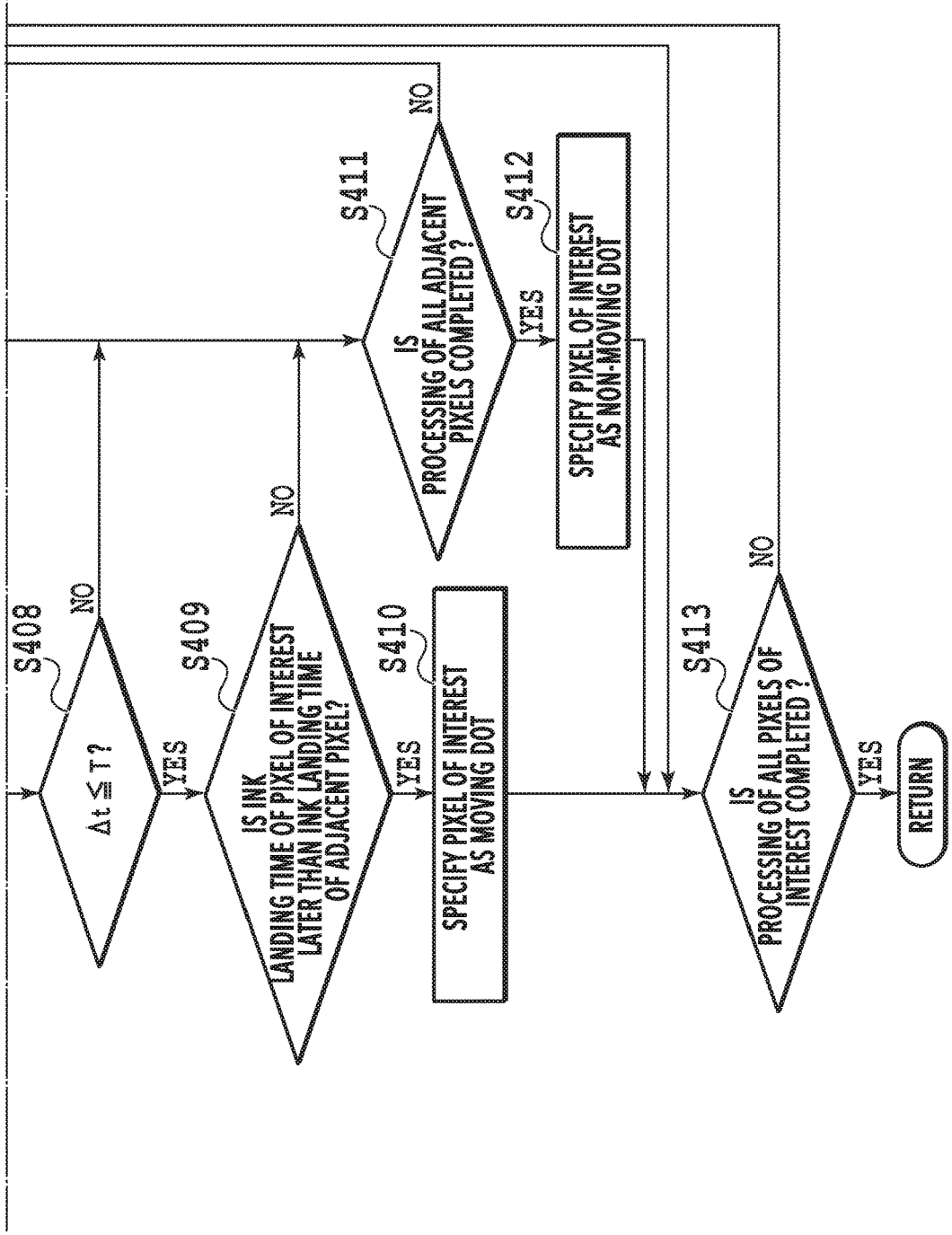
FIG. 4B is a flowchart for explaining moving dot determination processing.

FIG. 4 is a flowchart for explaining the moving dot determination processing performed by the MPU 101 at S305. In a case where this processing is started, at S401, first, the MPU 101 sets one processing-target pixel of interest from all the pixels included in the one-page area. In the present embodiment, in the XY plane, the pixel corresponding to the first column of the first nozzle (raster) is taken to be the first pixel of interest and after this, the pixel of interest is sequentially switched so that the pixel of interest moves in the raster direction and after the last raster is reached, the pixel of interest moves to the second column.

At S402, the MPU 101 determines whether or not the dot data of the pixel of interest indicates printing of a dot. In a case where the dot data indicates printing (1) of a dot, the processing advances to S403 and in the other case, that is, in a case where the dot data indicates non-printing (0), the processing advances to S413.

At S403, the MPU 101 specifies a nozzle corresponding to the pixel of interest.

At S404, the MPU 101 sets one pixel adjacent to the pixel of interest. As the adjacent pixel, it may also be possible to take the eight pixels around the pixel of interest as candidates, but here, the two pixels adjacent in the Y-direction (direction of nozzle arrangement) are taken to be candidates. That is, at S404, one pixel of the two pixels adjacent to the pixel of interest in the +Y-direction and in the −Y-direction is set as the adjacent pixel.

At S405, the MPU 101 determines whether or not one of large, medium, and small dots is printed at the adjacent pixel set at S404. In a case where it is determined that a dot is printed at the adjacent pixel, the processing advances to S406. On the other hand, in a case where it is determined that a dot is not printed at the adjacent pixel, the processing advances to S411.

At S406, the MPU 101 specifies the nozzle that prints a dot at the adjacent pixel. Further, at S407, the MPU 101 refers to the ink-landing-time-difference information acquired at S304 and acquires the ink-landing-time-difference Δt between the pixel of interest and the adjacent pixel. In a case of the pixel whose adjacent pixel is adjacent to the pixel of interest in the −Y direction in the state where the ink-landing-time-difference information is managed as in FIG. 2C, the ink-landing-time-difference Δt is the ink-landing-time-difference Δt stored in association with the nozzle specified at S403. On the other hand, in a case of the pixel whose adjacent pixel is adjacent to the pixel of interest in the +Y-direction, the ink-landing-time-difference Δt is the ink-landing-time-difference Δt stored in association with the nozzle specified at S406.

At S408, the MPU 101 determines whether or not the ink-landing-time-difference Δt acquired at S407 is less than or equal to the threshold value T (here, 10 msec) prepared in advance. In a case where it is determined that the ink-landing-time-difference Δt is less than or equal to the threshold value at S408, the processing advances to S409. On the other hand, in a case where the ink-landing-time-difference Δt acquired at S407 is larger than the threshold value T, the MPU 101 advances to S411.

At S409, the MPU 101 refers to the ink-landing-time-difference information acquired at S304 and determines whether the dot at the pixel of interest lands after or before the dot at the adjacent pixel lands (whether the dot at the pixel of interest is the subsequent landing dot or the preceding landing dot). In a case where the dot at the pixel of interest lands later, the processing advances to S410 and the dot at the pixel of interest is specified as the moving dot. On the other hand, in a case where it is determined that the dot at the pixel of interest lands before the dot at the adjacent pixel (the dot at the pixel of interest is the preceding landing dot), the processing advances to S411.

At S411, the MPU 101 determines whether or not the processing at S405 to S409 is performed for all the adjacent pixels of the pixel of interest. In a case where there remains an adjacent pixel to be processed, the processing returns to S404 and the next adjacent pixel is set. On the other hand, in a case where it is determined that the processing is performed for all the adjacent pixels, the processing advances to S412 and the pixel of interest is determined as a non-moving dot.

At S413, the MPU 101 determines whether or not the processing (processing at S402 to S412) is performed for all the pixels included in the one-page area as the above-described pixel of interest. In a case where there remains a pixel to be processed, the processing returns to S401 and a new pixel of interest is set. On the other hand, in a case where it is determined that the above-described processing is completed for all the pixels, this processing is terminated and the processing returns to the flowchart in FIG. 3.

Figure 5:
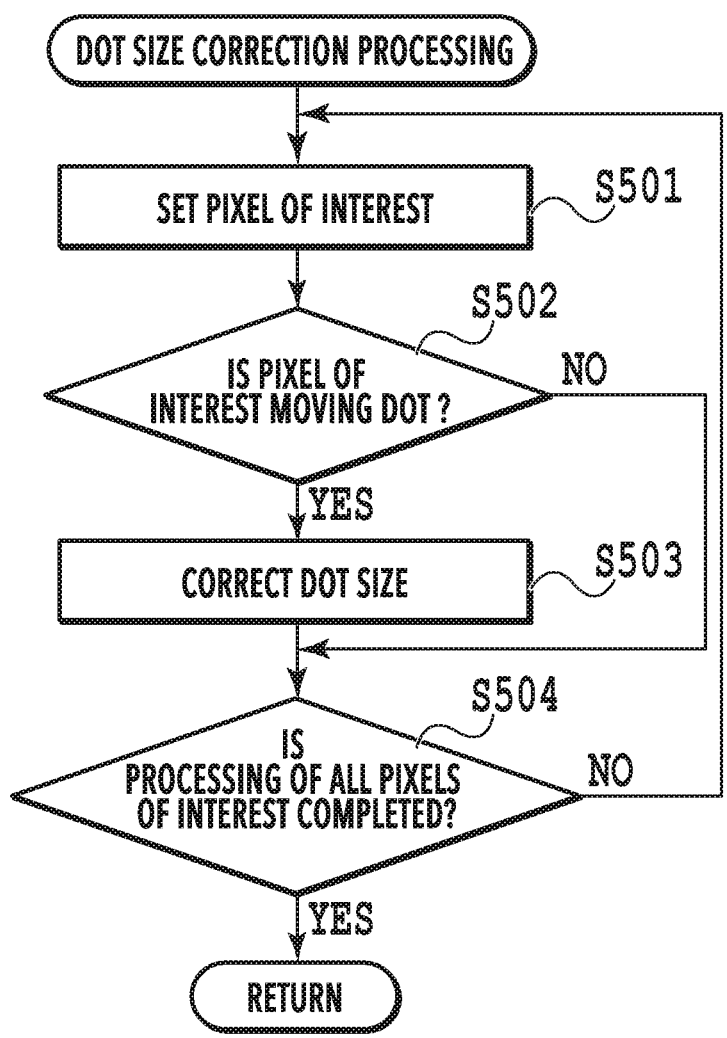
FIG. 5 is a flowchart for explaining correction processing.

FIG. 5 is a flowchart for explaining the correction processing performed by the MPU 101 at S305 in FIG. 3. In a case where this processing is started, first, the MPU 101 sets one processing-target pixel of interest from all the pixels included in the one-page area at S501.

At S502, the MPU 101 determines whether or not the dot at the pixel of interest set at S501 is specified as a moving dot. In a case where the dot is specified as a moving dot, the processing advances to S503 and in a case where the dot is not specified as a moving dot, the processing advances to S504.

At S503, the MPU 101 corrects the dot size of the pixel of interest to one-step larger size. That is, in a case where the dot data of the pixel of interest indicates printing of a small dot, the MPU 101 changes printing of a small dot to printing of a medium dot. Further, in a case where the dot data of the pixel of interest indicates printing of a medium dot, the MPU 101 changes printing of a medium dot to printing of a large dot. In a case where the dot data of the pixel of interest is a large dot, the MPU 101 keeps printing of a large dot as it is. In the printing apparatus of the present embodiment, in a case where the original dot size is a large dot, it is regarded that the dot does not move so much that the white paper area is exposed even on a condition that the liquid droplet interference takes place between adjacent dots.

At S504, the MPU 101 determines whether or not the processing is completed for all the pixels included in the one-page area as the pixel of interest. In a case where there remains a pixel to be processed, the processing returns to S501 and the next pixel of interest is set. On the other hand, in a case where it is determined that the processing is completed for all the pixels as the pixel of interest, this processing is terminated.

FIGS. 6A to 6D are schematic diagrams for explaining the effect in a case where the image processing of the present embodiment is performed. FIG. 6A shows an example of a dot pattern before correction, which is generated by the quantization processing unit 5. In FIG. 6A, the X-direction indicates the conveyance direction of a printing medium and the Y-direction indicates the nozzle arrangement direction, and each rectangle indicates the pixel area of nine pixels× three pixels arrayed within the page. Further, in the pixel area, the pixel to which a circle is attached indicates the pixel to which printing of a medium dot is set and the other pixels indicate pixels to which non-printing of a dot is set, respectively. In this example, a state where each of three nozzles prints four medium dots.

FIG. 6B shows a state where dots are printed on a printing medium in accordance with the dot pattern shown in FIG. 6A in a situation in which the liquid droplet interference does not occur. Each medium dot is printed without shifting from the position corresponding to each nozzle and a density distribution uniform in the Y-direction is obtained.

On the other hand, FIG. 6C shows a state where dots are printed on a printing medium in accordance with the dot pattern shown in FIG. 6A in a situation in which the liquid droplet interference occurs. The liquid droplets ejected from the center nozzle whose ink landing timing is the latest of the three nozzles are pulled and move to the sides of the adjacent dots having landed earlier by a shorter time difference. Consequently, the density at the pixel positions corresponding to the center nozzle is reduced and the pixel positions are recognized as a white streak extending in the X-direction.

FIG. 6D is a diagram showing the results of the correction processing of the present embodiment. FIG. 6D shows a dot pattern after being corrected by the dot pattern correction unit 8 and a state where dots are printed on a printing medium in accordance with this dot pattern. Of the dots corresponding to the center nozzle whose ink landing timing is the latest, the dot for which there is an adjacent dot in the ±Y-direction is specified as a moving dot and the dot is changed from a medium dot to a large dot. Consequently, even in a case where the dot moves somewhat in the ±Y-direction by the liquid droplet interference, a reduction in density at the pixel positions corresponding to the center nozzle is suppressed and the white streak is mitigated compared to that in FIG. 6C.

As explained above, according to the present embodiment, based on the dot pattern after the quantization processing and the ink-landing-time-difference information on each nozzle, a moving dot is specified and the moving dot is changed to a larger size dot. Due to this, the banding accompanying the liquid droplet interference is mitigated in the entire image within the page and it is made possible to output a uniform image without density unevenness.

In the above, only the pixels adjacent to the pixel of interest in the nozzle arrangement direction (Y-direction) are taken as adjacent pixels candidates, but there is a case where the liquid droplet interference affects a pixel adjacent in the X-direction or a pixel adjacent in the oblique direction.

The pixel adjacent in the X-direction is a pixel given the liquid droplet ejected from the same nozzle. However, in a case where the conveyance speed of a printing medium is sufficiently high and the driving cycle of each nozzle accompanying this is sufficiently short, there is a concern that the liquid droplet interference occurs even between pixels adjacent in the X-direction and image defect will result. Consequently, in the case such as this, it is sufficient to include a pixel adjacent in the X-direction also as the adjacent pixel candidate and correct the size of a dot that lands later to a large size on a condition that dots are printed continuously in the X-direction.

Further, in the above, explanation is given by the aspect in which the ink-landing-time-difference for the adjacent nozzle shown in FIG. 2C is taken to be the absolute value $\Delta t$ and the absolute value $\Delta t$ is managed together with information on whether a dot lands earlier or lands later, but of course the explanation is not limited to this. It may also be possible to manage the ink-landing-time-difference itself by a value to which a plus or minus sign is attached.

Second Embodiment

In the first embodiment, by specifying a moving dot that moves due to liquid droplet interference and changing the dot size thereof, a reduction in density at the position at which the dot is to be printed originally is suppressed. However, in this case, at the position of the adjacent dot toward which the moving dot is pulled, ink concentrates more than necessary, and therefore, the density increases and there is a case where a black streak is recognized.

Because of this, in the present embodiment, a dot that moves is specified as a moving source dot and the dot size thereof is changed to a larger size and on the other hand, the adjacent dot of the moving destination is also specified as a moving destination dot and processing to reduce the dot size is performed.

In the present embodiment also, the printing system explained in FIGS. 1A and 1B and FIGS. 2A to 2C is used and the image processing is performed in accordance with the flowchart shown in FIG. 3.

FIG. 7 is a flowchart for explaining the moving dot determination processing performed by the MPU 101 at S305 in FIG. 3 of the present embodiment. The processing up to S408 is the same as that of the first embodiment, and therefore, explanation is omitted.

At S701, the MPU 101 refers to the ink-landing-time-difference information acquired at S304 and determines whether a dot lands at the pixel of interest after a dot lands at the adjacent pixel or before a dot lands at the adjacent pixel (whether the dot that lands at the pixel of interest is a later landing dot or an earlier landing dot). In a case where a dot lands at the pixel of interest later, the processing advances to S702 and the dot at the pixel of interest is specified as a moving source dot. On the other hand, in a case where it is determined that a dot lands at the pixel of interest before a dot lands at the adjacent pixel, the processing advances to S703 and the dot at the pixel of interest is specified as a moving destination dot. The subsequent processing is the same as that of the first embodiment, and therefore, explanation is omitted.

By performing the processing as above, in the present embodiment, each dot generated by the quantization processing is specified as one of a moving source dot, a moving destination dot, and a non-moving dot.

Figure 8:
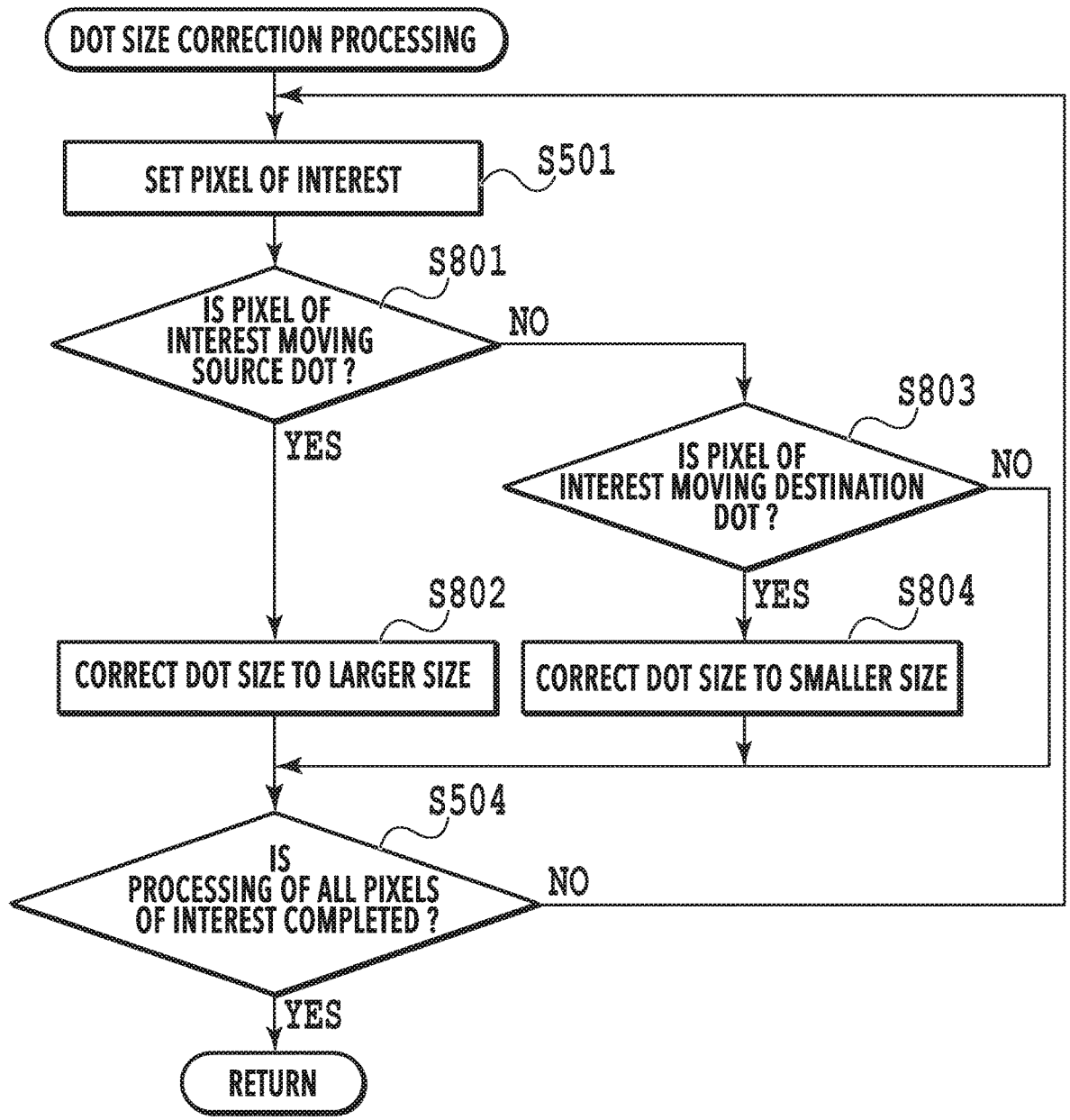
FIG. 8 is a flowchart for explaining correction processing.

FIG. 8 is a flowchart for explaining the correction processing performed by the MPU 101 at S306 in FIG. 3 of the present embodiment. The step at which the same processing as that of the first embodiment is performed is indicated by the same symbol as that in FIG. 5.

In a case where this processing is started, the MPU 101 first, at S501, sets one processing-target pixel of interest from all the pixels included in a one-page area.

At S801 that follows, the MPU 101 determines whether the dot at the pixel of interest set at S501 is specified as a moving source dot. In a case where the dot is specified as a moving source dot, the processing advances to S802 and in a case where the dot is not specified as a moving source dot, the processing advances to S803.

At S803, the MPU 101 determines whether the dot at the pixel of interest set at S501 is specified as a moving destination dot. In a case where the dot is specified as a moving destination dot, the processing advances to S804 and in a case where the dot is not specified as a moving destination dot, the processing advances to S504.

At S802, the MPU 101 corrects the dot size of the pixel of interest to a one-step larger size. That is, in a case where the dot data of the pixel of interest indicates printing of a small dot, the MPU 101 changes this to printing of a medium dot. Further, in a case where the dot data of the pixel of interest indicates printing of a medium dot, the MPU 101 changes this to printing of a large dot. In a case where the dot data of the pixel of interest is a large dot, the MPU 101 keeps printing of a large dot as it is.

On the other hand, at S804, the MPU 101 corrects the dot size of the pixel of interest to a smaller size. That is, in a case where the dot data of the pixel of interest indicates printing of a large dot, the MPU 101 changes this to printing of a medium dot. Further, in a case where the dot data of the pixel of interest indicates printing of a medium dot, the MPU 101 changes this to printing of a small dot. In a case where the dot data of the pixel of interest is a small dot, the MPU 101 changes this to non-printing of a dot.

At S504, the MPU 101 determines whether or not the processing is completed for all the pixels included in the one-page area as the pixel of interest. In a case where there remains a pixel to be processed, the processing returns to S501 and the next pixel of interest is set. On the other hand, in a case where it is determined that the processing is completed for all the pixels as the pixel of interest, this processing is terminated.

Figure 9:
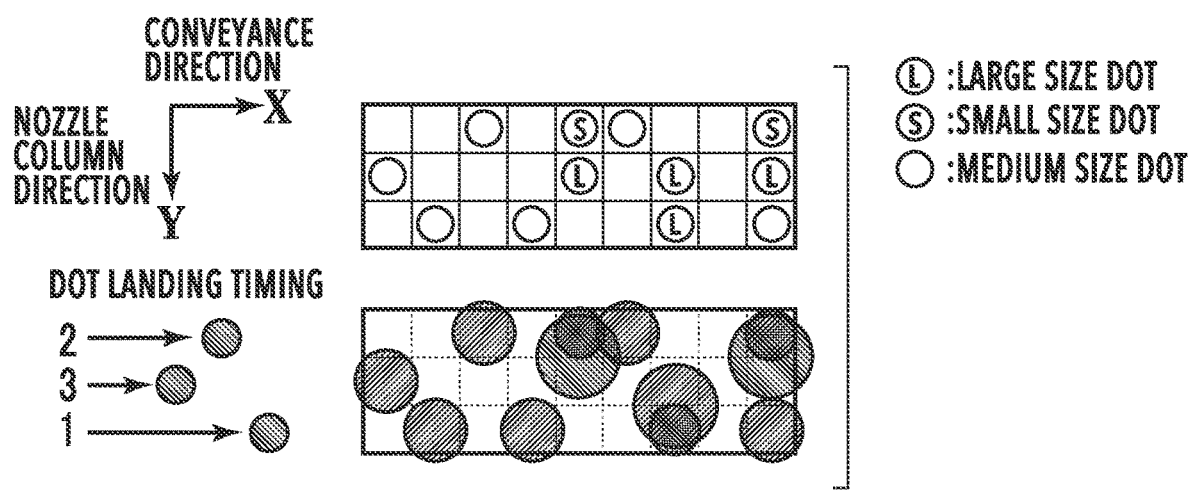
FIG. 9 is a diagram showing a printed state in a case where image processing of a second embodiment is performed.

FIG. 9 is a diagram showing the results of the correction processing of the present embodiment. FIG. 9 shows a dot pattern after being corrected by the dot pattern correction unit 8 and a state where dots are printed on a printing medium in accordance with this dot pattern. The dot pattern before the correction is the same as that in FIG. 6A.

Of the dots corresponding to the center nozzle whose ink landing timing is the latest, the dot for which there is a dot adjacent thereto in the +Y-direction is specified as a moving source dot and changed from a medium dot to a large dot. Further, of the dots corresponding to the nozzles on both sides, whose ink landing timing is earlier than that of the center nozzle, the dot adjacent to the moving source dot is specified as a moving destination dot and changed from a medium dot to a small dot. Because of this, even in a case where liquid droplet interference takes place between a moving source dot and a moving destination dot, the movement of the moving source dot is suppressed to a minimum and it is possible to stabilize the centroid of the two dots. As a result of this, it is possible to suppress both a reduction in density at the pixel position corresponding to the center nozzle and an increase in density at the pixel positions corresponding to the nozzles on both sides.

According to the embodiment explained above, a moving source dot and a moving destination dot are specified based on the dot pattern after quantization processing and the ink-landing-time-difference information on each nozzle. Then, the moving source dot is changed to a larger dot size and the moving destination dot is changed to a smaller dot size, respectively. Due to this, banding accompanying liquid droplet interference is mitigated in the entire image within the page and it is made possible to output a uniform image without density unevenness.

Third Embodiment

In the above-described embodiment, the density variation accompanying liquid droplet interference is suppressed by identifying a moving dot that moves by liquid droplet interference and changing the size of the dot or a moving destination dot. In contrast to this, in the present embodiment, the pixel position of a specified moving dot is moved to a pixel position having as faint a possibility as possible that liquid droplet interference occurs.

In the present embodiment also, the printing system explained in FIGS. 1A and 1B and FIGS. 2A to 2C is used and the image processing and the moving dot specification processing are performed in accordance with the flowcharts shown in FIG. 3 and FIG. 4.

Figure 10:
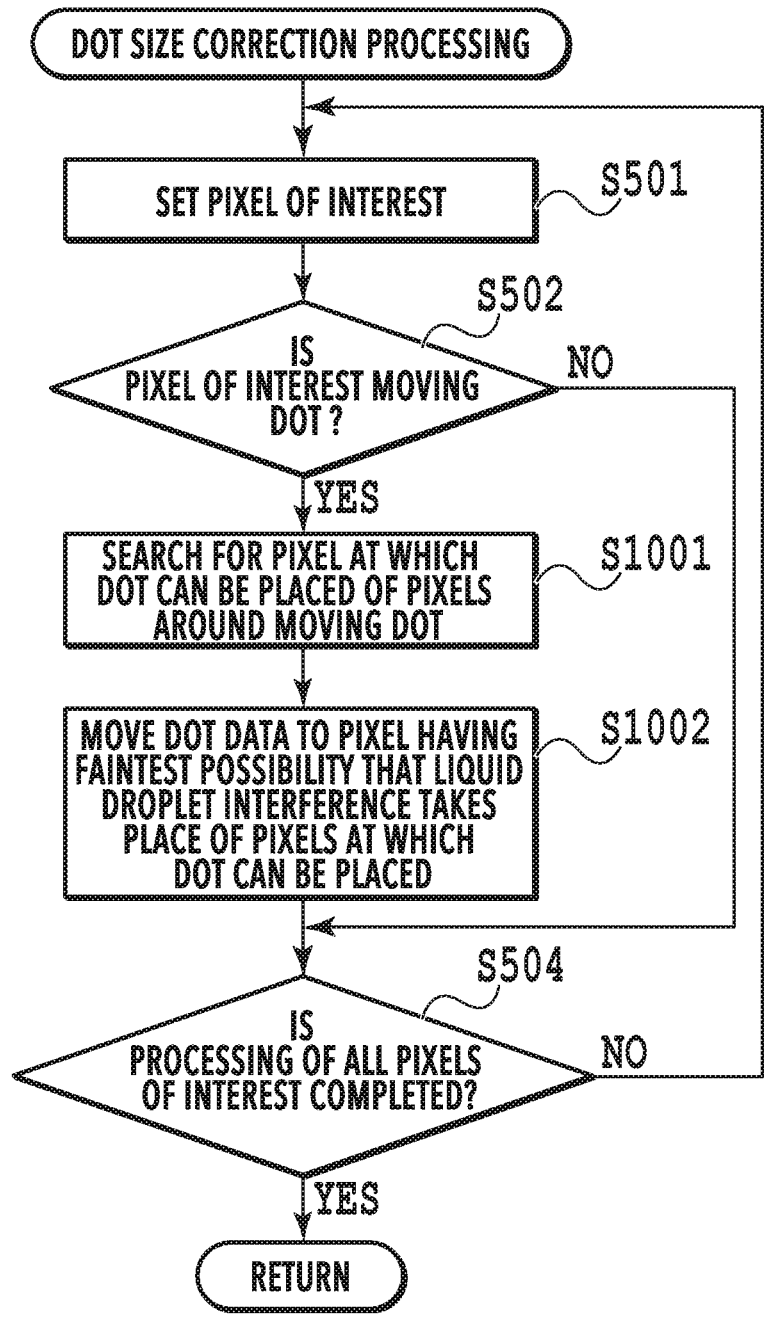
FIG. 10 is a flowchart for explaining correction processing.

FIG. 10 is a flowchart for explaining the correction processing performed by the MPU 101 at S306 in FIG. 3 of the present embodiment. The step of performing the same processing as that of the first embodiment is indicated by the same symbol as that in FIG. 5 and explanation is omitted here.

At S502, in a case of determining that the pixel of interest is specified as a moving dot, the MPU 101 advances to S1001 and in a case of determining that the pixel of interest is not specified as a moving dot, the MPU 101 advances to S1002.

At S1001, the MPU 101 searches for the presence/absence of a dot in the pixels around the pixel of interest. Specifically, of the eight pixels adjacent to the pixel of interest, an adjacent pixel to which non-printing of a dot is set is extracted as a moving destination candidate pixel.

At S1002, the MPU 101 selects one pixel at which liquid droplet interference is unlikely to take place from among the moving destination candidate pixels extracted at S1001 and moves the dot data of the pixel of interest to the pixel.

Specifically, of the moving destination candidate pixels, a pixel having as faint a possibility as possible that a dot exists in the peripheral eight pixels, or a pixel having as faint a possibility as possible that a dot is adjacent in the Y-direction even though the dot exists, or a pixel whose dot is a small dot, is set as a moving destination pixel. Then, printing (1) of the pixel of interest is changed to non-printing (0) and non-printing (0) of the moving destination pixel is changed to printing (1) of a dot size that has been set to the pixel of interest.

Figure 11:
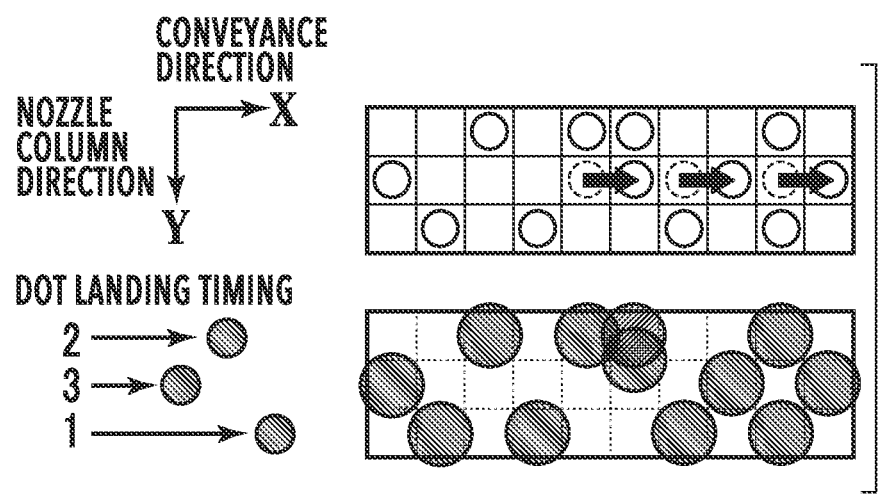
FIG. 11 is a diagram showing a printed state in a case where image processing of a third embodiment is performed.

FIG. 11 is a diagram showing the results of the correction processing of the present embodiment. FIG. 11 shows a dot pattern after being corrected by the dot pattern correction unit 8 and a state where dots are printed on a printing medium in accordance with the dot pattern. The dot pattern before the correction is the same as that in FIG. 6A.

Of the dots corresponding to the center nozzle whose ink landing timing is the latest, the dot for which there is a dot adjacent thereto in the ±Y-direction is moved by one pixel in the +X-direction. As a result of this, in the dot pattern after the correction, the liquid droplet interference itself is unlikely to take place compared to the original dot pattern.

According to the present embodiment as described above, it is possible to suppress the occurrence of banding accompanying liquid droplet interference in a state where the number of dots and the dot size corresponding to each nozzle are kept, which are indicated by the dot pattern generated by the quantization processing unit. Because of this, it is made possible to output a uniform image without density unevenness.

The method of extracting a moving destination candidate pixel at S1001 and the method of determining a moving destination pixel at S1002 are not limited to the methods explained above. The moving destination candidate pixel may include a pixel two or more pixels apart from the pixel of interest. Further, it may also be possible to determine a moving destination pixel in view of a variety of elements, such as dispersity of the entire image, edges, and overlap with a dot pattern of another color ink.

Figure 12:
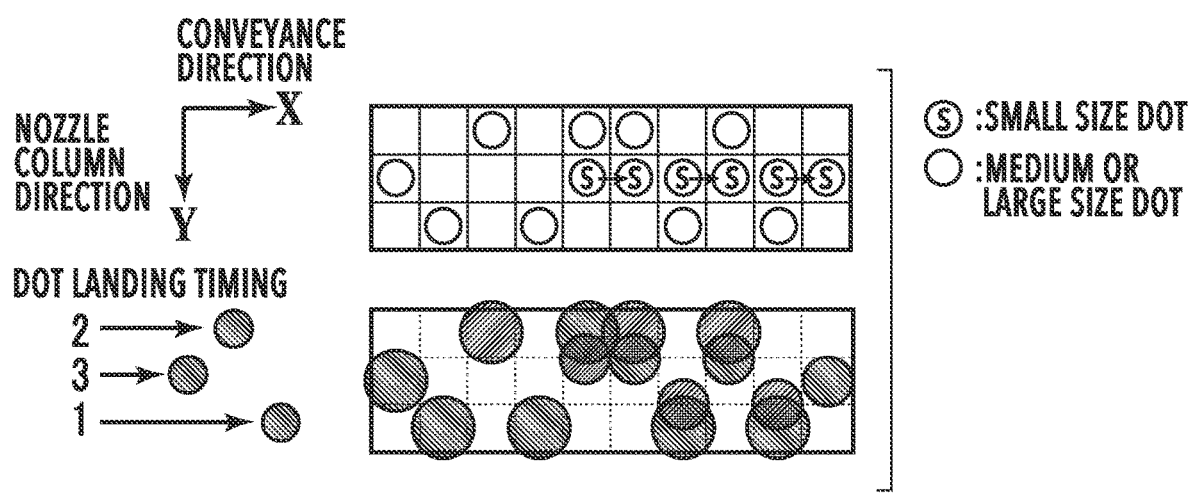
FIG. 12 is a diagram showing another example of a printed state in a case where the image processing of the third embodiment is performed.

Further, at S1002, in a case where the moving source dot is a large dot or a medium dot, it may also be possible to print one small dot at each of two pixels as shown in FIG. 12.

Other Embodiments

In the embodiment described above, in a case where one of large, medium, and small dots is printed at the adjacent pixel, the dot at the pixel of interest is specified as a moving dot. However, as in a case where the dot to be printed at the pixel of interest is a large dot and the dot to be printed at the adjacent pixel is a small dot, in a case where the moving source dot is sufficiently larger than the moving destination dot, there is a case where the movement itself of a dot does not take place. Further, in a case where both the dot at the pixel of interest and the dot at the adjacent pixel are small dots, there is a case where the two dots do not contact in the first place. In the case such as this, it may also be possible to determine whether or not the dot at the pixel of interest is a moving dot based on the magnitude relationship between the dot to be printed at the pixel of interest and the dot to be printed at the adjacent pixel, in addition to the ink-landing-time-difference information.

Further, it may also be possible to further widen the range of the pixels to be taken as the adjacent pixel candidates to an area wider than the area of the eight pixels around the pixel of interest. At this time, it may also be possible to determine whether or not the dot at the pixel of interest is a moving dot based on both the distance from the pixel of interest and the dot size. For example, in a case where a dot is printed at the candidate pixel adjacent in the +Y-direction of the pixel of interest, the dot at the pixel of interest is specified as a moving dot irrespective of the size of the dot. Then, in a case where a dot is printed at the candidate pixel a distance corresponding to one pixel apart from the pixel of interest, only on a condition that the dot is a large dot, it may also be possible to determine that the dot at the pixel of interest as a moving dot. At this time, it may also be possible to change the threshold value T for determining whether or not a dot is a moving dot in accordance with the distance from the pixel of interest.

The degree of movement of a dot resulting from liquid droplet interference changes depending on a variety of conditions, such as the type of printing medium, the physical properties of ink, the printing resolution, the ejection amount of the print head, and the ejection characteristic of each nozzle, in addition to the ink-landing-time-difference already explained in FIGS. 13A and 13B. Consequently, it is preferable to appropriately adjust the range of pixels to be taken to be candidates pixels (that is, the distance and direction from the pixel of interest) and the size and the threshold value T, based on which a dot is to be specified as a moving dot, based on the above-described variety of conditions. In particular, in a case where there are variations in the ejection amount and the ejection direction of each nozzle, it is effective to store in advance the ejection characteristic information also, such as the ejection amount and the ejection direction, in a memory in association with each nozzle. In this case, the MPU 101 specifies a moving dot based on the dot pattern generated by the quantization processing unit while referring to the ink-landing-time-difference information and the ejection characteristic information.

Further, in the above, explanation is given by using the ink jet printing apparatus that ejects ink by applying a voltage to a piezoelectric element included in each nozzle as an example, but the present invention is not limited to the aspect such as this. For example, even in a case where a print head is used, which adopts a method of ejecting ink as droplets by causing film boiling to take place in the ink by applying a voltage pulse to an electro-thermal conversion element, the present invention is effective. At this time, ejection ports of different sizes may be arranged, such as an ejection port for a large dot, an ejection port for a medium dot, and an ejection port for a small dot, on the ejection port surface or it may also be possible to design a configuration in which the dot size can be changed by modulating a voltage pulse to be applied to the electro-thermal conversion element.

Further, in the above, the ink-landing-time-difference as shown in FIG. 2C is determined based on the nozzle layout shown in FIG. 2B, but there is a case where the ink-landing-time-difference is determined by another factor. For example, in a printing apparatus that drives a plurality of nozzles in a distributed manner because of restrictions on the nozzle ejection frequency and the power source capacity of the apparatus, even in a case where a plurality of nozzles is arrayed in one column in the Y-direction, an adjacent dot lands on a printing medium with a time difference. Even in the configuration such as this, liquid droplet interference occurs in a case where the ink-landing-time-difference exists, and therefore, it is possible to obtain the same effect as that of the above-described embodiment by managing ink-landing-time-difference information.

Further, in the above, explanation is given by using the full-line type ink jet printer as shown in FIG. 2A. However, it is also possible to adopt the embodiment described above in a serial type ink jet printer that forms an image by repeating the print main scan of the print head and the conveyance operation of a printing medium alternately. In particular, in a case of one-pass printing (single-pass printing) that completes an image of the same image area of a printing medium by a one-time print main scan of the print head, the same phenomenon as that in the above-described embodiment occurs in the same image area, and therefore, the correction of a dot pattern explained in the above-described embodiment is effective.

Further, it is possible to adopt the present invention even in multi-pass printing that completes an image of the same image area by a plurality of print main scans of the print head in a case where liquid droplet interference takes place between dots printed by each print scan. In this case, by performing the same correction processing as that in the above-described embodiment for the dot pattern corresponding to each print scan, banding within each print scan is reduced, and therefore, it is possible to contribute to uniformity of the entire image as a result.

In the above, explanation is given by the contents that all pieces of the characteristic processing of the present invention are performed by the MPU 101 (microprocessor) of a personal computer, but the present invention is not limited to the aspect such as this. Referring to FIG. 1A again, it may also be possible to perform the series of image processing explained in FIG. 3 in a sharing manner by the image processing apparatus 1 and the printing apparatus 200, or it may also be possible for the printing apparatus 200 to perform all the steps. In a case of the former, the printing system shown by the image processing apparatus 1 and the printing apparatus 200 is the image processing apparatus of the present invention, and in a case of the latter, the printing apparatus is the image processing apparatus of the present invention.

According to the present invention, it is possible to output an image whose banding is unlikely to be recognized by suppressing movement of a dot accompanying liquid droplet interference.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-170604, filed Sep. 12, 2018, which is hereby incorporated by reference wherein in its entirety.

What is claimed is:

1. An image processing apparatus that generates dot data for printing an image on a printing medium by using dots of different sizes formed by a print head including a plurality of nozzles ejecting ink, the image processing apparatus comprising:
    a first acquisition unit configured to acquire dot data that specifies printing or non-printing of each of the dots of a plurality of sizes for each pixel;
    a second acquisition unit configured to acquire, for each nozzle, time difference information relating to time differences between liquid droplets of ink ejected by adjacent nozzles in landing on the printing medium;
    a specification unit configured to specify a dot being pulled by a dot having landed earlier on the printing medium based on the dot data and the time difference information; and
    a correction unit configured to correct a dot specified by the specification unit in the dot data,
    wherein, in the plurality of nozzles of the print head, the time differences of adjacent nozzles are uneven and the correction unit corrects the dot data so as to change a dot size of a dot specified by the specification unit.

2. The image processing apparatus according to claim 1, wherein
    the specification unit specifies a dot that is ejected after an adjacent dot so as to land with a landing time difference from the adjacent dot less than or equal to a predetermined time.

3. The image processing apparatus according to claim 1, wherein
    the correction unit corrects the dot data so as to change a dot size of a dot specified by the specification unit to a larger dot size.

4. The image processing apparatus according to claim 3, wherein
    the correction unit corrects the dot data so as to change a dot size of a dot located at a destination to which a dot specified by the specification unit moves to a smaller dot size.

5. The image processing apparatus according to claim 1, wherein
    the specification unit compares the time difference information and a threshold value and specifies a dot that lands with a time difference less than or equal to the threshold value from a dot that is printed at an adjacent pixel position as the dot being pulled.

6. The image processing apparatus according to claim 5, wherein
    the specification unit specifies the dot being pulled by a dot having landed earlier in the printing medium based on a dot size of a dot for which printing is specified by the dot data.

7. The image processing apparatus according to claim 1, further comprising:
a unit configured to acquire ejection characteristic information relating to an ejection characteristic of each of the plurality of nozzles, wherein
the specification unit specifies the dot based on the time difference information and the ejection characteristic information.

8. The image processing apparatus according to claim 1, wherein
the plurality of nozzles is arrayed in a direction intersecting a direction of a relative scan in which the printing medium is relatively scanned, being shifted from one another in the intersecting direction.

9. The image processing apparatus according to claim 1, wherein
the plurality of nozzles ejects ink by applying a voltage to a piezoelectric element arranged internally.

10. The image processing apparatus according to claim 1, wherein
an image is completed on the printing medium by a one-time relative scan of the printing medium with respect to the plurality of nozzles.

11. The image processing apparatus according to claim 1, further comprising:
a printing unit configured to eject ink from the plurality of nozzles in accordance with dot data corrected by the correction unit.

12. The image processing apparatus according to claim 1, wherein
the correction unit does not change a size of a dot specified by the specification unit in a case where the dot specified by the specification unit is a dot of a maximum size.

13. An image processing method that generates dot data for printing an image on a printing medium by using dots of different sizes formed by a print head including a plurality of nozzles ejecting ink, the image processing method comprising:
acquiring dot data that specifies printing or non-printing of each of the dots of a plurality of sizes for each pixel;
acquiring, for each nozzle, time difference information relating to time differences between liquid droplets of ink ejected by adjacent nozzles in landing on the printing medium;
specifying a dot being pulled by a dot having landed earlier on the printing medium based on the dot data and the time difference information; and
correcting a specified dot in the dot data,
wherein, in the plurality of nozzles of the print head, the time differences of adjacent nozzles are uneven and the dot data is corrected so as to change a dot size of a dot specified by the specifying.

14. The image processing method according to claim 13, wherein
a dot that is ejected after an adjacent dot is specified so as to land with a landing time difference from the adjacent dot less than or equal to a predetermined time.

15. A non-transitory computer readable storage medium storing a program for causing a computer to function as each unit of an image processing apparatus that generates dot data for printing an image on a printing medium by using dots of different sizes formed by a print head including a plurality of nozzles ejecting ink, the image processing apparatus, comprising:
a first acquisition unit configured to acquire dot data that specifies printing or non-printing of each of the dots of a plurality of sizes for each pixel;
a second acquisition unit configured to acquire, for each nozzle, time difference information relating to time differences between liquid droplets of ink ejected by adjacent nozzles in landing on the printing medium;
a specification unit configured to specify a dot being pulled by a dot having landed earlier on the printing medium based on the dot data and the time difference information; and
a correction unit configured to correct a dot specified by the specification unit in the dot data,
wherein, in the plurality of nozzles of the print head, the time differences of adjacent nozzles are uneven and the correction unit corrects the dot data so as to change a dot size of a dot specified by the specification unit.

16. The non-transitory computer readable storage medium according to claim 15, wherein
the specification unit specifies a dot that is ejected after the adjacent dot so as to land with a landing time difference from an adjacent dot less than or equal to a predetermined time.

* * * * *